Aug. 23, 1932.  C. E. HILTON  1,873,763
SANITARY PIVOTED ROOST STRUCTURE
Filed Feb. 12, 1931   2 Sheets-Sheet 1

Inventor
C. E. Hilton,
By L. F. Randolph Jr.
Attorney

Aug. 23, 1932.  C. E. HILTON  1,873,763

SANITARY PIVOTED ROOST STRUCTURE

Filed Feb. 12, 1931  2 Sheets-Sheet 2

Inventor
C. E. Hilton,
By L. F. Kendrick Jr.
Attorney

Patented Aug. 23, 1932

1,873,763

UNITED STATES PATENT OFFICE

CALVIN E. HILTON, OF HAMBURG, IOWA

SANITARY PIVOTED ROOST STRUCTURE

Application filed February 12, 1931. Serial No. 515,372.

This invention relates to a sanitary roost construction for hen houses and the like and it particularly aims to provide a novel construction wherein the perch bars are associated with an inclined pan and jointly therewith are pivotally mounted to facilitate emptying of the pan and also to facilitate automatic dumping or emptying of such pan upon unlatching thereof.

The more specific objects and advantages will become apparent from a consideration of the description following taken in connection with accompanying drawings illustrating an operative embodiment.

In said drawings:—

Figures 1, 2:
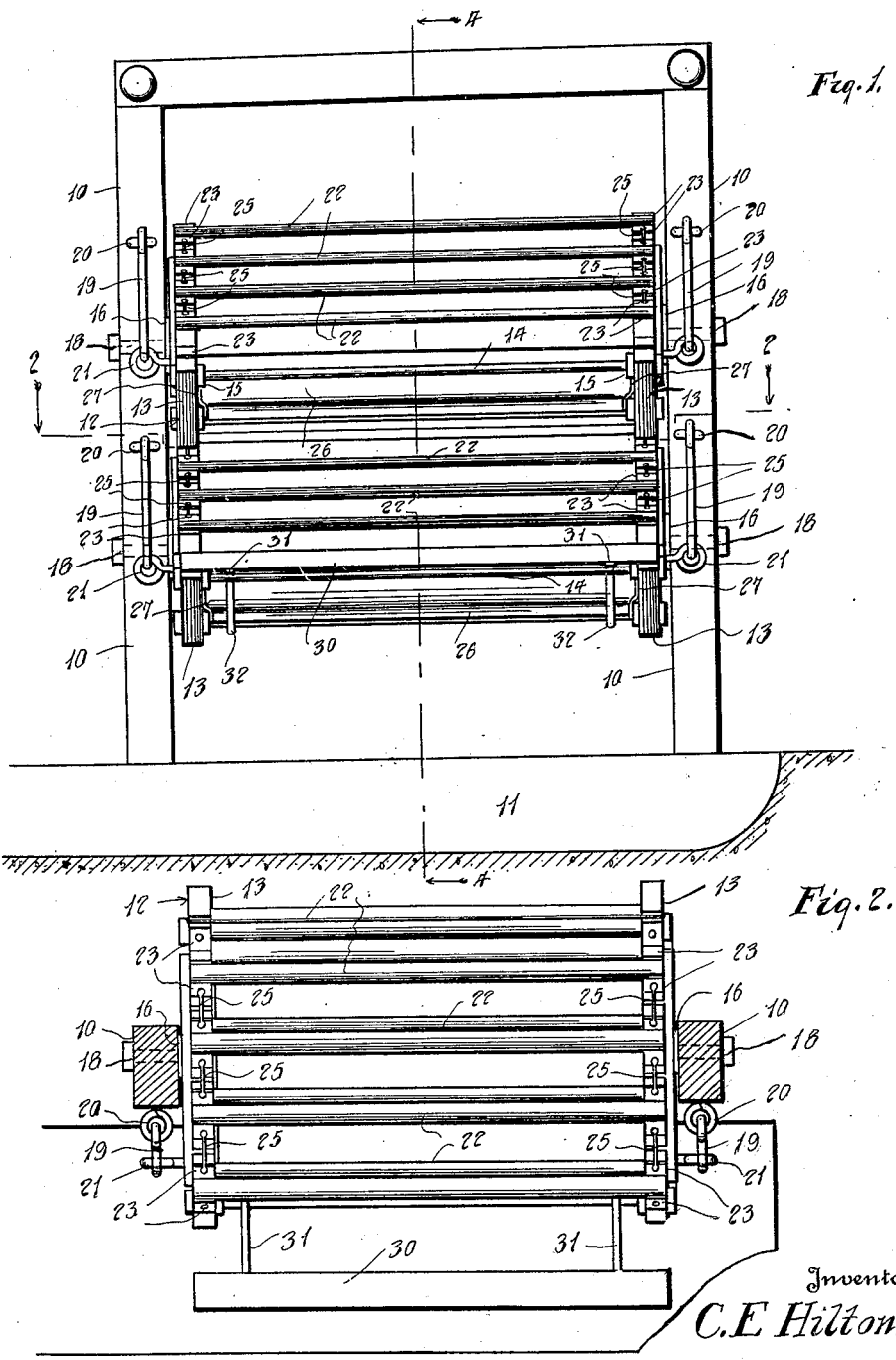
Figure 1 is a front elevation of the device constituting the invention.
Figure 2 is a horizontal sectional view taken on the line 2—2 of Figure 1.

Referring specifically to the drawings, an arch shaped frame may be provided having uprights 10, and arranged within the hennery or other enclosure and if desired adjacent a pit 11 adapted to receive the droppings.

A plurality of roost members are employed, being shown as a whole at 12. Such roost members comprise end members 13, which are connected detachably together by means of a multiplicity of longitudinally extending bolts 14, on which nuts 15 are threaded, the same engaging both the inner and outer surfaces of the end members so as to hold the structure in rigid relation, and are preferably countersunk therein.

Figure 3:
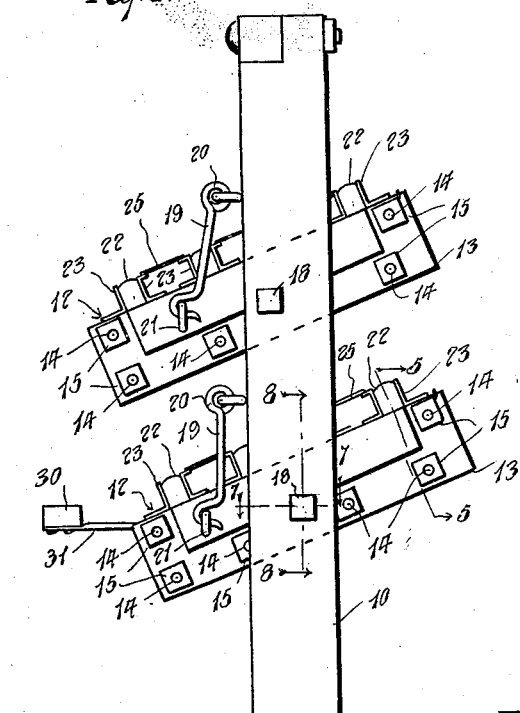
Figure 3 is an end elevation.
Figure 4:
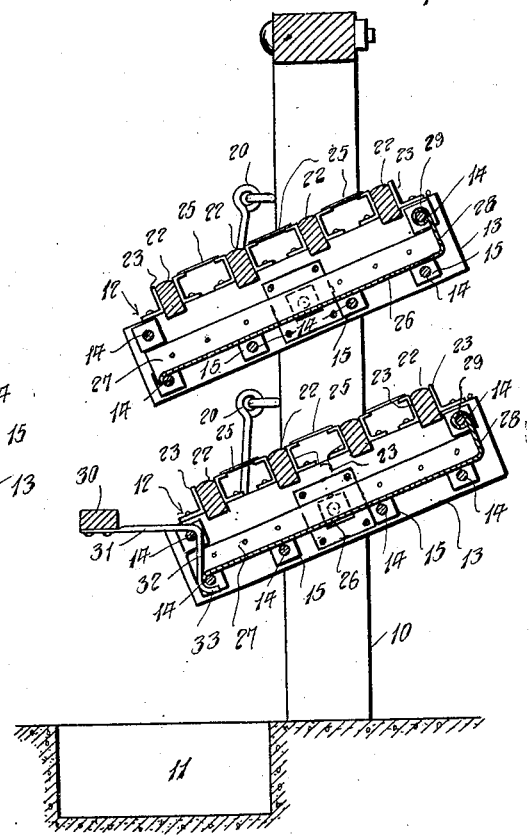
Figure 4 is a vertical sectional view taken on the line 4—4 of Figure 1.
Figure 5:
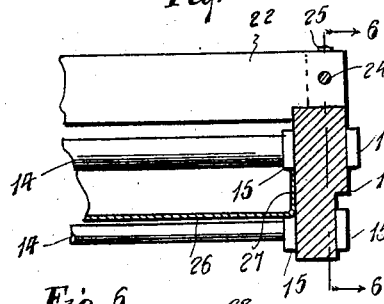
Figure 5 is a sectional view taken on the line 5—5 of Figure 3.
Figures 7, 8:
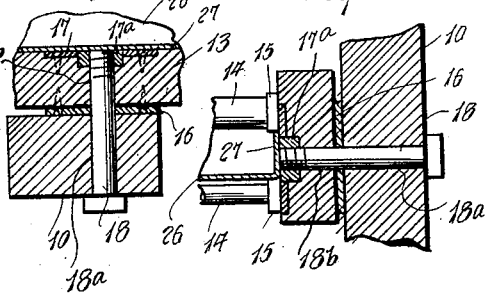
Figure 7 is a cross sectional view taken on the line 7—7 of Figure 3.
Figure 8 is a cross sectional view taken on the line 8—8 of Figure 3.

Metallic plates 16 are screwed or otherwise fastened to the outer side of end members 13 and other plates 17 are secured to the inner sides of said end members and have nuts 17$^a$ countersunk therein and in said end members as shown best in Figures 7 and 8. The pivot means for the roost members 12 are screw bolts 18 that extend through openings 18$^a$ in the uprights 10 and 18$^b$ in the side members 13 and are screwed into nuts 17$^a$, to provide for adjustment of the roost members between the uprights by turning the screw bolts to tighten or loosen the connection. Normally the roosts are disposed at an angle as shown in Figures 3 and 4, being held in that position by hooks 19 pivoted at 20 to the uprights and detachably engaged with eyelets 21 on such end members.

Figure 6:
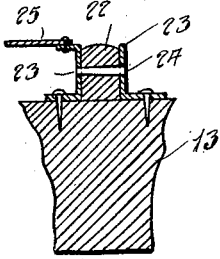
Figure 6 is a sectional view taken on the line 6—6 of Figure 5.

A series of perch bars 22 are arranged longitudinally of the roost members 12, resting on the end members 13 and being positioned by brackets 23 secured thereto. The perch bars 22 may be frictionally engaged with the brackets 23 to prevent displacement, if desired but it is preferred to secure them by means of pins 24 as shown in Figure 6, which are driven friction tight through openings in the brackets and the perch bars. In order to prevent roosting on the end members 13, barrier wires 25 bridge adjacent pairs of the brackets 23.

Below the perch bars 22, a metallic or other pan 26 is arranged to catch the droppings and due to the inclination thereof tends to guide the same into the pit 11. Such pan 26 rests on the lowermost row of bolts 14 and has side flanges 27 and a rear flange 28. Flange 28 extends above the side flanges 27 and is curled at 29, about an adjacent rod 14 to form a support or connection.

An auxiliary perch bar is provided as at 30 which has arms 31 extending forwardly therefrom provided with depending angle portions 32 and hooks 33. The hooks 33 engage one of the bolts 14 and the angle portions 32 at its junction with the remainder of the arms engage another bolt 14, thus detachably securing the auxiliary perch in place.

When it is desired to clean the perches, the latches 19 are detached from the eyelets 21, whereupon the perch members will seek a vertical position due to their pivoting thus automatically emptying the pan 26. In such lowered position, it will also be realized that more space is provided between the uprights 10 for walking purposes especially when cleaning the pit 11, into which the pans 26 empty.

Various changes may be resorted to provided they fall within the spirit and scope of the invention.

I claim as my invention:—

1. A device of the class described comprising a roost member, means supporting the same off center for pivotal movement so that when free it will assume a substantially vertical position by gravity and displaceable means normally maintaining the roost member in an inclined position, the roost member upon release being adapted to seek said substantially vertical position.

2. A device of the class described comprising a roost member, means supporting the same off center for pivotal movement so that when free it will assume a substantially vertical position by gravity, and displaceable means normally maintaining the roost member in an inclined position, the roost member upon release being adapted to seek said substantially vertical position, and a pan arranged at the base of the roost member to catch and discharge droppings.

3. A roost member having a frame, perch bars thereon, a pan on said frame under said perch bars, securing members holding the parts of the frame together, and said pan resting on one of said securing members and being fastened to another of the securing members and means pivotally mounting the frame for tilting to discharge the contents of the pan.

In testimony whereof I affix my signature.

CALVIN E. HILTON.